United States Patent
Katayama (10) Patent No.: US 8,305,494 B2
(45) Date of Patent: Nov. 6, 2012

(54) BROADCAST RECEIVING DEVICE

(75) Inventor: Takahiro Katayama, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1377 days.

(21) Appl. No.: 11/943,678

(22) Filed: Nov. 21, 2007

(65) Prior Publication Data

US 2008/0117332 A1    May 22, 2008

(30) Foreign Application Priority Data

Nov. 22, 2006  (JP) .................................. 2006-315184

(51) Int. Cl.
*H04N 5/45* (2011.01)
*H04N 5/445* (2011.01)

(52) U.S. Cl. ....................................... 348/565; 348/567

(58) Field of Classification Search .................. 348/565, 348/567

See application file for complete search history.

(56) References Cited

U.S. PATENT DOCUMENTS 5,148,275 A * 9/1992 Blatter et al. ................. 348/567
2007/0216807 A1 * 9/2007 Otsuka et al. ................ 348/565

FOREIGN PATENT DOCUMENTS

JP         2006-067205 A       3/2006

* cited by examiner

*Primary Examiner* — Kieu Oanh T Bui (74) *Attorney, Agent, or Firm* — Global IP Counselors (57) ABSTRACT

A broadcast receiving device includes a first receiving unit, a second receiving unit, a display control unit, an audio determination unit, a switching determination unit and a switching execution unit. The display control unit displays a first image corresponding to a first television broadcast received by the first receiving unit on a main screen in a monitor, and displays a second image corresponding to a second television broadcast received by the second receiving unit on a subscreen in the monitor. The switching determination unit compares a first audio corresponding to the first television broadcast with a second audio corresponding to the second television broadcast, and determines whether or not the second audio is to be outputted instead of the first audio. The switching execution unit executes audio switching processing based on a determination result of the switching determination unit so that the second audio is outputted instead of the first audio.

18 Claims, 3 Drawing Sheets

BROADCAST RECEIVING DEVICE

CROSS-REFERENCE TO RELATED APPLICATIONS

This application claims priority to Japanese Patent Application No. 2006-315184 filed on Nov. 22, 2006. The entire disclosure of Japanese Patent Application No. 2006-315184 is hereby incorporated herein by reference.

BACKGROUND OF THE INVENTION

1. Field of the Invention

The present invention relates to a broadcast receiving device. More specifically, the present invention relates to a broadcast receiving device that receives television broadcasts and outputs the television broadcasts to a monitor.

2. Background Information

The number of television channels has been increasing in recent years as digital broadcasts have become more popular. A multi-screen display technology has been proposed to display a plurality of programs simultaneously on a single monitor provided to a broadcast receiving device. It is difficult to distinguish audio channels if the audio channels from the plurality of programs are outputted at the same time. Therefore, an audio channel from one of the plurality of programs being displayed in multi-screen format is selected for output. For instance, when one of the plurality of programs is displayed larger on a main screen in the monitor, and another program is displayed on a subscreen in the monitor, just the audio channel from the program displayed on the main screen is outputted, but not the audio channel from the program displayed on the subscreen.

Viewers usually focus their attention on the main screen in the multi-screen display. Thus, the viewers do not notice if the program displayed on the subscreen shows a decisive scene, an exciting scene, or the like (hereinafter referred to as a noteworthy scene). Therefore, the viewers may end up missing the noteworthy scene.

With a conventional broadcast receiving device, either audio of the program displayed on the main screen or audio of the program displayed on the subscreen is selected for output to a speaker based on a state of the audio of the subscreen (see Japanese Laid-Open Patent Application No. 2006-67205, for example).

With the conventional broadcast receiving device, the audio of the subscreen is subjected to spectrum analysis. When a frequency component corresponding to cheering exceeds a preset level, the audio of the subscreen is outputted instead of the audio of the program displayed on the main screen. As a result, when the noteworthy scene appears on the program displayed on the subscreen, missing the noteworthy scene is prevented.

However, with the conventional broadcast receiving device, there is a possibility that the audio of the main screen is switched to the audio of the subscreen even though there is a noteworthy scene on the program displayed on the main screen. Therefore, there are instances that the audio outputted to the speaker is not switched at a proper timing. Also, if a time period for the spectrum analysis is not long enough, then there is a risk that the audio of the main screen is switched to the audio of the subscreen even though there is no noteworthy scene on the program displayed on the subscreen. Conversely, if the time period for the spectrum analysis is performed is too long, there is a risk that the audio of the main screen is not switched to the audio of the subscreen even though there is a noteworthy scene on the program displayed on the subscreen.

In view of the above, it will be apparent to those skilled in the art from this disclosure that there exists a need for an improved television receiving device. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a broadcast receiving device with which audio output is switched at a proper timing.

In accordance with one aspect of the present invention, a broadcast receiving device includes a first receiving unit, a second receiving unit, a display control unit, an audio determination unit, a switching determination unit and a switching execution unit. The first receiving unit is configured to receive a first television broadcast. The second receiving unit is configured to receive a second television broadcast. The display control unit is configured to display a first image corresponding to the first television broadcast received by the first receiving unit on a main screen in a monitor and display a second image corresponding to the second television broadcast received by the second receiving unit on a subscreen in the monitor. The audio output unit is configured to selectively output one of a first audio corresponding to the first television broadcast received by the first receiving unit and a second audio corresponding to the second television broadcast received by the second receiving unit. The switching determination unit is configured to compare the first audio with the second audio, and determine whether or not the second audio is to be outputted instead of the first audio. The switching execution unit configured to execute audio switching processing on the audio output unit based on a determination result of the switching determination unit so that the second audio is outputted instead of the first audio.

With the broadcast receiving device of the present invention, it is possible to provide a broadcast receiving device with which audio output is switched at a proper timing.

These and other objects, features, aspects and advantages of the present invention will become apparent to those skilled in the art from the following detailed description, which, taken in conjunction with the annexed drawings, discloses a preferred embodiment of the present invention.

DETAILED DESCRIPTION OF THE PREFERRED EMBODIMENTS

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
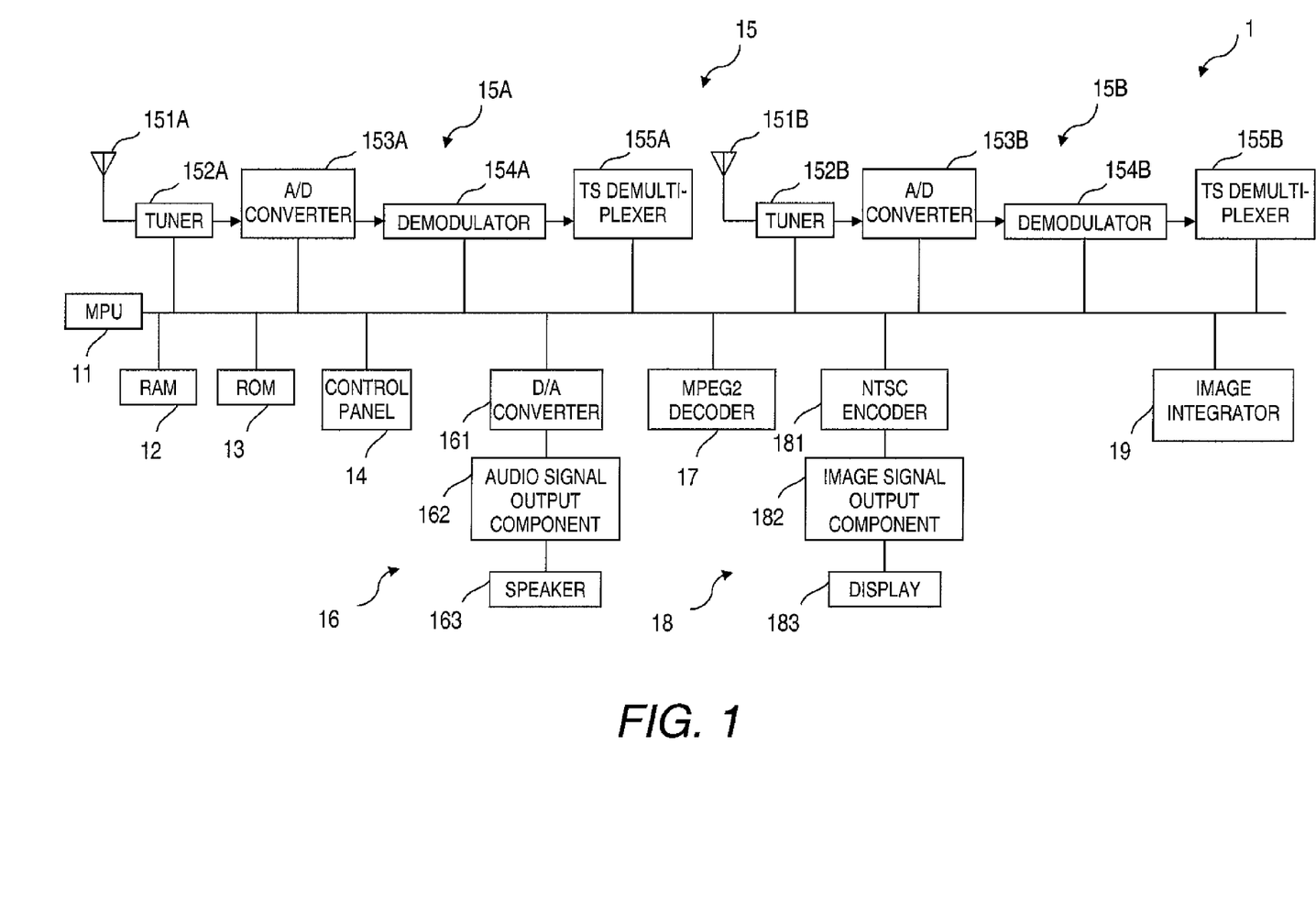
FIG. 1 is a block diagram illustrating a digital broadcast receiver in accordance with one embodiment of the present invention.

FIG. 1 is a block diagram illustrating a digital broadcast receiver 1 (e.g., broadcast receiving device). The digital broadcast receiver 1 receives television broadcasts and outputs the television broadcasts. The digital broadcast receiver 1 includes an MPU (Micro Processing Unit) 11, a RAM (Random Access Memory) 12, a ROM (Read Only Memory) 13, a control panel 14, a reception component 15, an audio output component 16, an MPEG-2 (Motion Picture Experts Group) decoder 17, an image output component 18 and an image integrator 19.

The MPU 11 controls an operation of the entire digital broadcast receiver 1. The RAM 12 readably and writably stores information such as audio information and video information. The ROM 13 stores a control program for operating the MPU 11, for example.

The control panel 14 is used to perform various operations, such as turning power on and off, and changing channels. The reception component 15 receives and demodulates the television broadcasts. The reception component 15 includes a first reception component 15A (e.g., first receiving unit or first receiving means) and a second reception component 15B (e.g., second receiving unit or second receiving means). The first reception component 15A receives one (first) television broadcast. The second reception component 15B receives another (second) television broadcast. The first reception component 15A and the second reception component 15B have substantially the same configuration. Therefore, in the following description, the first reception component 15A and the second reception component 15B is collectively referred to as the reception component 15, and is distinguished only when necessary. The reception component 15 (e.g., the first reception component 15A and the second reception component 15B) has an antenna 151 (e.g., an antenna 151A and an antenna 151B), a tuner 152 (e.g., a tuner 152A and a tuner 152B), an A/D converter 153 (e.g., an A/D converter 153A and an A/D converter 153B), a demodulator 154 (e.g., a demodulator 154A and a demodulator 154B), and a TS (Transport Stream) demultiplexer 155 (e.g., a TS demultiplexer 155A and a TS demultiplexer 155B).

The antenna 151 receives television broadcast waves. The tuner 152 tunes in a preset channel from the television broadcast waves received by the antenna 151. The A/D converter 153 converts an analog output signal of the tuner 152 into a digital signal. The demodulator 154 demodulates output information from the A/D converter 153. The TS demultiplexer 155 separates the output information demodulated by the demodulator 154 by type, and outputs audio information and video information.

The audio output component 16 selectively outputs audio corresponding to either the television broadcast received by the first reception component 15A or the television broadcast received by the second reception component 15B. The audio output component 16 includes a D/A converter 161, an audio signal output component 162 and a speaker 163. The D/A converter 161 converts the audio information outputted from the TS demultiplexer 155 (digital information) into an analog audio signal. The audio signal output component 162 outputs the analog audio signal to the speaker 163. The speaker 163 outputs audio corresponding to the analog audio signal.

The MPEG 2 decoder 17 decodes the video information outputted from the TS demultiplexer 155 into pre-compression video information.

The image output component 18 outputs the video information decoded by the MPEG2 decoder 17. The image output component IS includes an NTSC (National Television Standards Committee) encoder 181, an image signal output component 182 and a display 183 (e.g., monitor or display means). The NTSC encoder 181 converts the video information decoded by the MPEG2 decoder 17 into an NTSC-format television signal. The image signal output component 182 outputs the NTSC-format television signal to the display 183. The display 183 is a display device such as an LCD (Liquid Crystal Display), PDP (Plasma Display Panel), or the like. The display 183 displays video corresponding to the NTSC-format television signal outputted from the image signal output component 182.

The image integrator 19 (e.g., display control unit or display control means) performs image integration processing. Specifically, in the image integration processing, a first image corresponding to the one television broadcast received by the first reception component 15A is displayed on a main screen in the display 183. Furthermore, a second image corresponding to the other television broadcast received by the second reception component 15B is displayed on a subscreen in the display 183. More specifically, the image integrator 19 produces an integrated image by integrating the first image and the second image so that the second image is displayed on the subscreen in part of the first image displayed on the main screen (such as in a lower-right part of the main screen).

The digital broadcast receiver 1 receives the television broadcasts as follows. First, a transmitted digital broadcast wave is received by the antenna 151. When the control panel 14 is used to tune in a channel, switching of a transponder or a channel received by the tuner 152 is performed. The received digital broadcast wave is converted into digital information by the A/D converter 153, and demodulated by the demodulator 154.

The digital broadcast wave is transmitted from a transmitting side (transmitting station) as a TS (Transport Stream) packet. The TS packet includes the video information, the audio information, control information including channel information, and so forth. The video information, the audio information and the control information are separated and outputted by the TS demultiplexer 155. Then, the video information, the audio information and the control information are stored in the RAM 12. The audio information corresponding to the one television broadcast or the other television broadcast is read out from the RAM 12, and is converted into an analog audio signal by the D/A converter 161. Then, audio is outputted from the speaker 163 via the audio signal output component 162.

Also, the video information corresponding to the one television broadcast and the other television broadcast is read out from the RAM 12, and is decoded into pre-compression video information by the MPEG2 decoder 17. Then, the pre-compression video information is subjected to the image integration processing by the image integrator 19, and outputted as the integrated image. The integrated image is converted into the NTSC-format television signal by the NTSC encoder 181. Then, the video corresponding to the NTSC-format television signal (integrated video obtained by the integration of the video information corresponding to the one television broadcast and the other television broadcast as the main screen and the subscreen, respectively) is displayed on the display 183 via the image signal output component 182.

Figure 2:
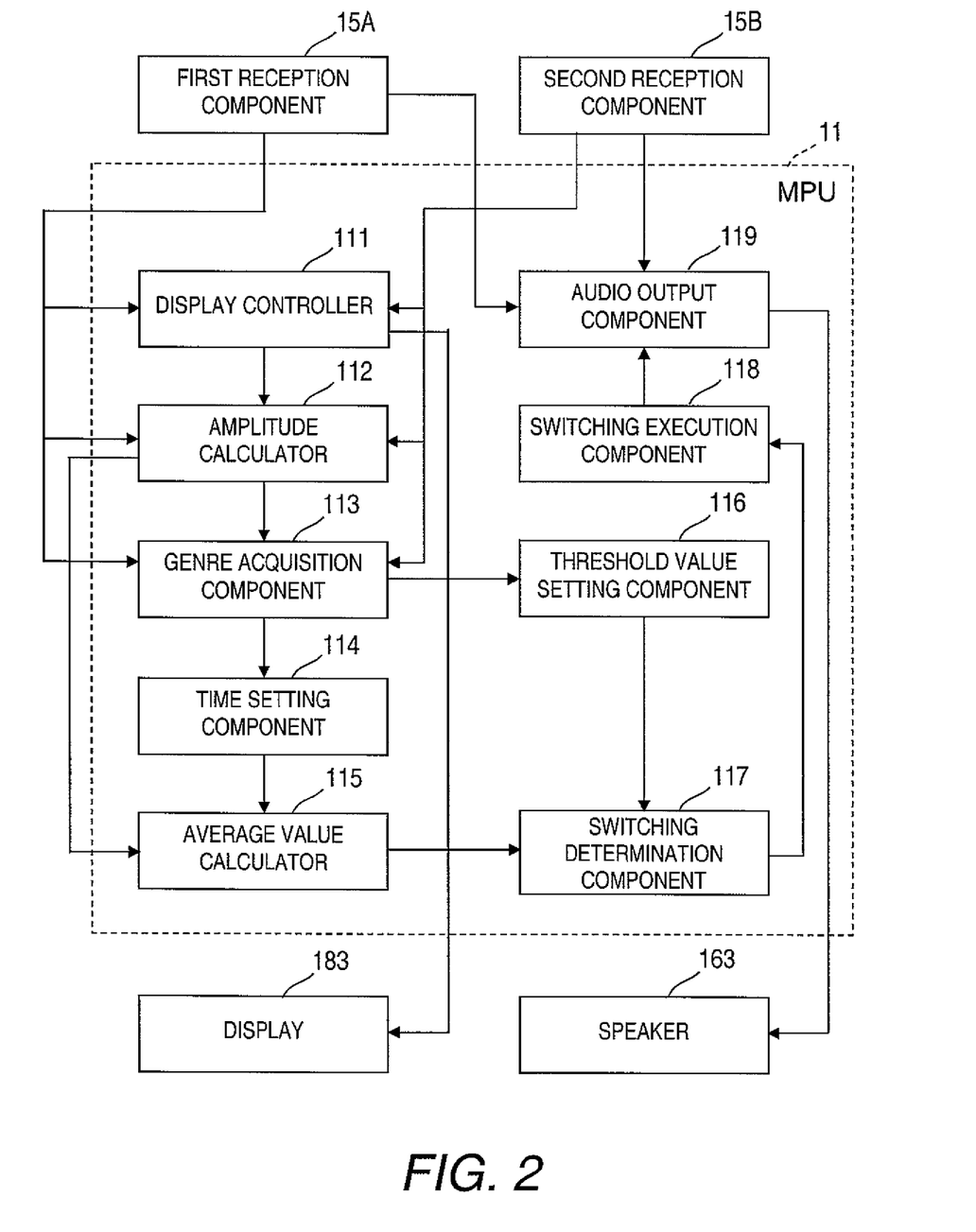
FIG. 2 is a block diagram illustrating a functional configuration of an MPU of the digital broadcast receiver.

FIG. 2 is a block diagram illustrating a functional configuration of the MPU 11 of the digital broadcast receiver 1. The MPU 11 functionally includes a display controller 111, an amplitude calculator 112, a genre acquisition component 113, a time setting component 114, an average value calculator 115, a threshold value setting component 116, a switching determination component 117, a switching execution component 118 and an audio output component 119.

The MPU 11 functions as the display controller 111, the amplitude calculator 112, the genre acquisition component 113, the time setting component 114, the average value calculator 115, the threshold value setting component 116, the switching determination component 117, the switching execution component 118, the audio output component 119 and other such functional components by reading and executing control programs pre-stored in the ROM 13 or the like.

Data stored in the RAM 12 and ROM 13 can be stored on a removable recording medium such as a hard disk, optical disk, flexible disk, CD (Compact Disk), DVD Digital Versatile Disk), semiconductor memory, or the like. In this case, the data can be readable by a hard disk drive, optical disk drive, flexible disk drive, silicon disk drive, cassette medium reader, or other such driver.

The display controller 111 (e.g., display control unit or display control means) displays the first image on the main screen in the display 183, and displays the second image on the subscreen in the display 183.

The amplitude calculator 112 (e.g., amplitude calculation unit or amplitude calculation means) subjects a first audio and a second audio to spectrum analysis with Fourier transform or the like. The first audio is audio corresponding to the one (first) television broadcast received by the first reception component 15A. The second audio is audio corresponding to the other (second) television broadcast received by the second reception component 15B. The amplitude calculator 112 calculates a first amplitude value AMP1 and a second amplitude value AMP2. The first amplitude value AMP1 is a total value of the amplitude of the first audio corresponding to a frequency within a range of about 100 Hz to 1 kHz. The second amplitude value AMP2 is a total value of amplitude of the second audio corresponding to a frequency within a range of about 100 Hz to 1 kHz.

The genre acquisition component 113 acquires first genre information and the second genre information from an event information table stored in the control information. The first genre information and the second genre information are program genre information received by the first reception component 15A and the second reception component 15B, respectively. The event information table is specified by ATSC (Advanced Television Systems Committee) Standard A/65c, for example.

Here, a situation in which the event information table includes the genre information will be described. However, if the event information table does not include the genre information, the genre information can be produced from information stored in the event information table. For instance, the genre information can be produced from information about an event name (program name) stored in the event information table. The genre information indicates a classification of the program, such as sports, drama, variety or movie.

The time setting component 114 (e.g., time setting unit or time setting means) sets a first specific time period T1 and a second specific time period T2 based on the first genre information and the second genre information, respectively. The first specific time period T1 and the second specific time period T2 are time periods that are multiples of two or greater of predetermined time periods (50 msec here). If the genre of the program indicated by the first genre information (or second genre information) is a genre that has rapid changes in an audio level (such as in a sports program), the time setting component 114 sets the first specific time period T1 (or the second specific time period T2) to 0.5 sec (50 msec×10). On the other hand, if the genre of the program is a genre that has slow changes in the audio level (such as a drama), the time setting component 114 sets the first specific time period T1 (or the second specific time period T2) to 5 sec (50 msec× 100).

The first specific time period T1 (or the second specific time period T2) can be set by pre-storing a table containing the first specific time period T1 (and the second specific time period T2) associated with the genre information in the RAM 12, etc. The time setting component 114 reads the first specific time period T1 (or the second specific time period T2) according to the first genre information (or the second genre information) from the table stored in the RAM 12, etc. In this case, the processing of the time setting component 114 is simplified.

The average value calculator 115 (e.g., average value calculation unit or average value calculation means) calculates a first average value AV1 and a second average value AV2. The first average value AV1 is an average value of the first amplitude value AMP1 in the first specific time period T1 set by the time setting component 114. The second average value AV2 is an average value of the second amplitude value AMP2 in the second specific time period T2 set by the time setting component 114.

The threshold value setting component 116 (e.g., threshold setting unit or threshold setting means) sets a first threshold value SH1 and a second threshold value SH2 based on the first genre information and the second genre information, respectively, acquired by the genre acquisition component 113.

The switching determination component 117 (e.g., switching determination unit or switching determination means) determines whether or not the difference (AV2−AV1) obtained by subtracting the first average value AV1 from the second average value AV2 is greater than or equal to the first threshold value SH1 set by the threshold value setting component 116. If the difference is greater than or equal to the first threshold value SH1 (AV2−AV1≧SH1), then it is determined that the second audio is to be outputted from the speaker 163 instead of the first audio.

Also, the switching determination component 117 determines whether or not the difference (AV1−AV2) obtained by subtracting the second average value AV2 from the first average value AV1 is greater than or equal to the second threshold value SH2 after the switching execution component 118 has executed audio switching processing so that the second audio is to be outputted from the speaker 163 instead of the first audio. If the difference is greater than or equal to the second threshold value SH2 (AV1−AV2≧SH2), then it is determined that the first audio is to be outputted from the speaker 163 instead of the second audio (that is, the audio to be outputted is returned to an original state).

The switching execution component 118 (e.g., switching execution unit or switching execution means) executes the audio switching processing based on the determination result of the switching determination component 117. In the audio switching processing, the audio output component 119 either outputs the second audio from the speaker 163 instead of the first audio, or outputs the first audio from the speaker 163 instead of the second audio (that is, the audio to be outputted is returned to an original state).

The audio output component 119 (e.g., audio output unit or audio output means) outputs the first audio from the speaker 163, and switches the audio outputted from the speaker 163 between the first audio and the second audio based on a command from the switching execution component 118.

Figure 3:
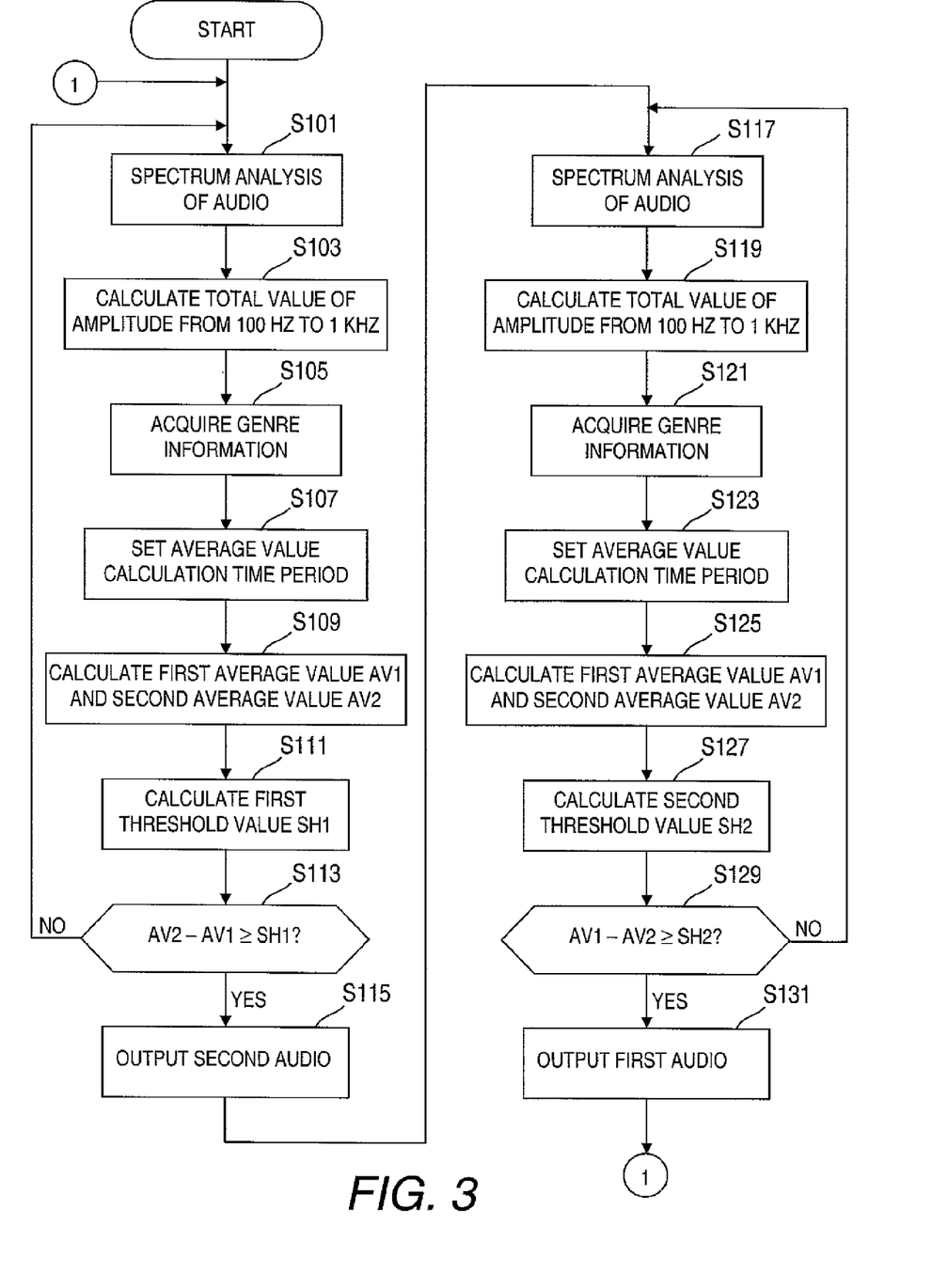
FIG. 3 is a flowchart illustrating an operation of the digital broadcast receiver.

FIG. 3 is a flowchart illustrating an operation of the digital broadcast receiver 1 (mainly the MPU 11). The first audio is outputted from the speaker 163 when the operation starts. First, the audio signals of the first and second audios are subjected to the spectrum analysis (S101) for the predetermined time periods (e.g. first and second predetermined time periods) (e.g., 50 msec), which can be equal or unequal times. Then the amplitude calculator 112 calculates the first amplitude value AMP1 and the second amplitude value AMP2 (S103).

The first genre information and the second genre information are acquired by the genre acquisition component 113 (S105). Then, the time setting component 114 sets the first specific time period T1 and the second specific time period T2 based on the first genre information and the second genre information, respectively, acquired in step S105 (S107). Next, the average value calculator 115 calculates the first average value AV1 and the second average value AV2 (S109).

The threshold value setting component 116 sets the first threshold value SH1 based on the first genre information and the second genre information acquired in step S105 (S111). Then, the switching determination component 117 determines whether or not the difference (AV2−AV1) obtained by subtracting the first average value AV1 from the second average value AV2 is greater than or equal to the first threshold value SH1 set in step S111 (S113). If the difference is not greater than or equal to the first threshold value SH1 (that is, if the difference is less than the first threshold value SH1) (No in step S113), then the processing flow returns to step S101, and the processing from step S101 is repeated. If the difference is determined to be greater than or equal to the first threshold value SH1 (Yes in step S113), then the switching execution component 118 executes the audio switching processing so that the second audio is outputted from the speaker 163 instead of the first audio (S115).

The amplitude calculator 112 subjects each of the audio signals of the first audio and the second audio to spectrum analysis for the predetermined time periods (e.g., 50 msec) (S117). Then, the amplitude calculator 112 calculates the first amplitude value AMP1 and the second amplitude value AMP2 (S119).

The first genre information and the second genre information are acquired by the genre acquisition component 113 (S121). Then, the time setting component 114 sets the first specific time period T1 and the second specific time period T2 based on the first genre information and the second genre information, respectively, acquired in step S121 (S123). Next, the average value calculator 115 calculates the first average value AV1 and the second average value AV2 (S125).

The threshold value setting component 116 sets the first threshold value SH2 based on the first genre information and the second genre information acquired in step S121 (S127). Next, the switching determination component 117 determines whether or not the difference (AV1−AV2) obtained by subtracting the second average value AV2 from the first average value AV1 is greater than or equal to the second threshold value SH2 set in step S127 (S129). If the difference is not greater than or equal to the second threshold value SH2 (that is, if the difference is less than the second threshold value SH2) (No in step S129), then the processing flow returns to step S117, and the processing from step S117 is repeated. If the difference is determined to be greater than or equal to the second threshold value SH2 (Yes in S129), then the switching execution component 118 executes the audio switching processing so that the first audio is outputted from the speaker 163 instead of the second audio (S131). Then, the processing flow returns to step S101, and the processing from step S101 is repeated.

With the digital broadcast receiver 1, the second audio corresponding to the other television broadcast displayed on the subscreen in the display 183 is compared with the first audio corresponding to the one television broadcast displayed on the main screen in the display 183. Then, it is determined whether or not the second audio is to be outputted from the speaker 163 instead of the first audio. The audio switching processing is executed based on the determination result so that the second audio is outputted from the speaker 163 instead of the first audio. Therefore, the audio output is switched at a proper timing.

Specifically, the second audio is compared with the first audio, and it is determined whether or not the second audio is to be outputted from the speaker 163 instead of the first audio. Thus, when a noteworthy scene comes up in the program displayed on the main screen, switching to the second audio of the program displayed on the subscreen is prevented. Therefore, the audio output is switched at the proper timing.

Also, the audio signals of the first audio and the second audio are each subjected to the spectrum analysis for the predetermined time periods (for example, 50 msec). Then, the first amplitude value AMP1 and the second amplitude value AMP2 are calculated. The first amplitude value AMP1 and the second amplitude value AMP2 are the total values of the amplitude corresponding to a frequency within a preset specific range (100 Hz to 1 kHz here). Then, based on the first amplitude value AMP1 and the second amplitude value AMP2, it is determined whether or not the second audio is to be outputted from the speaker 163 instead of the first audio. Therefore, the audio output is switched at even better timing.

Specifically, the audio output is switched at even better timing by properly setting the time period in which the audio signals of the first audio and the second audio are subjected to the spectrum analysis, and the range of frequency of the audio signals used for determination (for example, by setting the time period in which the spectrum analysis is performed to 50 msec and the range of the frequency of the audio signals used for determination to about 100 Hz to 1 kHz).

Furthermore, the audio output is switched at even better timing since the range of frequency of the audio signals used for determination is about 100 Hz to 1 kHz, which corresponds to the frequency of human voice.

In addition, for the first audio, the first average value AV1 is calculated. The first average value AV1 is the average value of the first amplitude value AMP1 in the first specific time period T1. The first specific time period T1 is a predetermined specific multiple of two or greater of the predetermined time period (50 msec here). Furthermore, for the second audio, the second average value AV2 is calculated. The second average value AV2 is the average value of the second amplitude value AMP2 in the second specific time period T2. The second specific time period T2 is a predetermined specific multiple of two or greater of the predetermined time period (50 msec here). Then, it is determined whether or not the second audio is to be outputted from the speaker 163 instead of the first audio based on the first average value AV1 and the second average value AV2. Therefore, the audio output is switched at even better timing by properly setting the first specific time period T1 and the second specific time period T2.

For example, if the program corresponding to the one television broadcast has rapid changes in the audio level (such as in a sports program), and the program corresponding to the other television broadcast has slow changes in the audio level (such as a drama), then the audio output is switched at even better timing by setting the first specific time period T1 to 0.5 sec (50 msec×10) and the second specific time period T2 to 5 sec (50 msec×100).

Also, it is determined whether or not the difference obtained by subtracting the first average value AV1 from the second average value AV2 is greater than or equal to the preset first threshold value SH1. If the difference is greater than or equal to the first threshold value SH1 (AV2−AV1≧SH1), then it is determined that the second audio is to be outputted from the speaker 163 instead of the first audio. Therefore, the audio output is switched at even better timing.

Specifically, the audio output is switched at even better timing by properly setting the first threshold value SH1. For example, the viewers have the audio output switched as frequently as desired by setting the first threshold value SH1 higher when the viewers wish to reduce how often the audio is switched, and by setting the first threshold value SH1 lower when the viewers wish to increase how often the audio is switched.

Furthermore, the first genre information and the second genre information are acquired for programs corresponding to the one television broadcast and the other television broadcast, respectively. The first specific time period T1 and the second specific time period T2 are set based on the first genre information and the second genre information, respectively. Then, the average value of the first amplitude value AMP1 in the first specific time period T1 is calculated as the first average value AV1. The average value of the second amplitude value AMP2 in the second specific time period T2 is calculated as the second average value AV2. Therefore, the audio output is switched at even better timing.

Specifically, the first specific time period T1 and the second specific time period T2 are each set based on the first genre information and the second genre information. Thus, the first specific time period T1 and the second specific time period T2 are set to the proper values. Therefore, the audio output is switched at even better timing.

For example, if the genre of the program corresponding to the one television broadcast is a genre that has rapid changes in the audio level (such as a sports program), and the genre of the program corresponding to the other television broadcast is a genre that has slow changes in the audio level (such as a drama), then the audio output is switched at even better timing by setting the first specific time period T1 to 0.5 sec (50 msec×10) and the second specific time period T2 to 5 sec (50 msec×100).

In addition, the first threshold value SH1 is set based on the first genre information and the second genre information. Then a determination is made using the first threshold value SH1. Therefore, the audio output is switched at even better timing.

Specifically, since the first threshold value SH1 is set based on the program genre information, the first threshold value SH1 is set to a proper value. As a result, the audio output is switched at even better timing.

For example, if the genre of the program corresponding to the one television broadcast is a genre that has a high audio level (such as a sports program), and the genre of the program corresponding to the other television broadcast is a genre that has a low audio level (such as a drama), then the audio output is switched at even better timing by setting the first threshold value SH1 higher.

Also, after the audio switching processing is executed so that the second audio is outputted from the speaker 163 instead of the first audio, it is determined whether or not the first audio is to be outputted from the speaker 163 instead of the second audio based on the first average value AV1 and the second average value AV2. Then, the audio switching processing is executed based on the determination result so that the first audio is outputted from the speaker 163 instead of the second audio. Therefore, the audio output is switched to the original state at a proper timing (in which the first audio is outputted instead of the second audio).

Furthermore, it is determined whether or not the difference obtained by subtracting the second average value AV2 from the first average value AV1 is greater than or equal to the second threshold value SH2. If the difference is greater than or equal to the second threshold value SH1 (AV1−AV2≧SH1), then it is determined that the first audio is to be outputted from the speaker 163 instead of the second audio. Therefore, the audio output is switched to the original state at even better timing (in which the first audio is outputted instead of the second audio) by setting the second threshold value SH2 to a proper value.

In addition, the second threshold value SH1 is set based on the first genre information and the second genre information. Then, a determination is made using the second threshold value SH2. Therefore, the audio output is switched to the original state at even better timing (in which the first audio is outputted instead of the second audio).

Specifically, since the second threshold value SH1 is set based on the program genre information, the second threshold value SH2 is set to the proper value. Therefore, the audio output is switched to the original state at even better timing (in which the first audio is outputted instead of the second audio).

For example, if the genre of the program corresponding to one television broadcast is a genre that has a high audio level (such as a sports program), and the genre of the program corresponding to the other television broadcast is a genre that has a low audio level (such as a drama), then the audio output is switched to the original state at even better timing (in which the first audio is outputted instead of the second audio) by setting the second threshold value SH2 lower.

The broadcast receiving receiver 1 can be any type of broadcast receiving device that receives television broadcasts and outputs the television broadcasts to the display 183 so that the television broadcasts are visible from outside. For instance, the broadcast receiving device can be a device that receives analog broadcasts or both analog and digital broadcasts.

The display 183 can be configured as a device that is separate from the digital broadcast receiver 1. For example, the display 183 can be a monitor provided to a personal computer or the like.

The display controller 111 can switch the image between the main screen and the subscreen every time the audio output is switched between the first audio and the second audio.

Specifically, when the audio output is switched from the first audio to the second audio by the switching execution component 118, the display controller 111 displays the second image on the main screen and the first image on the subscreen. Furthermore, when the audio output is switched from the second audio to the first audio by the switching execution component 118, the display controller 111 displays the first image on the main screen and the second image on the subscreen. This prevents even more effectively the viewer from missing the noteworthy scene.

The display controller 111 can display the first image on the main screen in the display 183 and displays a plurality of subscreens including the second image on the display 183. In this case, even more images can be displayed on the display 183 at the same time, which may be more convenient for the viewer.

The time periods in which the audio signals of the first audio and the second audio are subject to the spectrum analysis can be set based on the first genre information and the second genre information, respectively. In this case, the first amplitude value AMP1 and the second amplitude value AMP2 can be obtained more properly. Specifically, for programs of a genre having sudden changes in the audio level (such as musical programs), the spectrum analysis is preferably performed for a shorter time (such as 10 msec). Furthermore, for programs of a genre having more gradual changes in the audio level (such as news programs), the spectrum analysis is preferably performed for a longer time (such as 100 msec).

The amplitude calculator 112 can calculate the total value of the amplitude in another frequency range. For instance, the amplitude calculator 112 can set the frequency range based on the first genre information and the second genre information acquired by the genre acquisition component 113. In this case, the first amplitude value AMP1 and the second amplitude value AMP2 can be obtained more properly. Specifically, when the frequency range specifying the noteworthy scene can be estimated in advance from the genre, the frequency range over which the amplitude calculator 112 calculates the total amplitude value is preferably set to a frequency range that specifies the noteworthy scene.

Whether or not to switch the audio output can be determined based on the first amplitude value AMP1 and the second amplitude value AMP2. Processing is simplified in this case.

When the audio switching processing is executed by the switching execution component 118 so that the second audio is outputted from the speaker 163 instead of the first audio, the switching determination component 117 can determine whether or not the difference obtained by subtracting the second average value AV2 from the first average value AV1 is greater than or equal to the second threshold value SH2 after a preset specific time period (such as 1 minute) has elapsed. This prevents a switch from the second audio to the first audio immediately after (such as 10 seconds after) the audio output has been switched from the first audio to the second audio.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A broadcast receiving device comprising:
    a first receiving unit configured to receive a first television broadcast;
    a second receiving unit configured to receive a second television broadcast;
    a display control unit configured to display a first image corresponding to the first television broadcast received by the first receiving unit on a main screen in a monitor, and display a second image corresponding to the second television broadcast received by the second receiving unit on a subscreen in the monitor;
    an audio output unit configured to selectively output one of a first audio corresponding to the first television broadcast received by the first receiving unit and a second audio corresponding to the second television broadcast received by the second receiving unit;
    a switching determination unit configured to compare the first audio with the second audio, and determine whether or not the second audio is to be outputted instead of the first audio;
    a switching execution unit configured to execute audio switching processing on the audio output unit based on a determination result of the switching determination unit so that the second audio is outputted instead of the first audio; and
    an amplitude calculation unit configured to subject the first and second audios to spectrum analysis for first and second predetermined time periods, respectively, and calculate a first amplitude value and a second amplitude value that are total values of amplitudes corresponding to a frequency within a specific range,
    the switching determination unit being further configured to determine whether or not the second audio is to be outputted instead of the first audio based on the first amplitude value and the second amplitude value.

2. The broadcast receiving device according to claim 1, wherein the frequency within the specific range is about 100 Hz to 1 kHz.

3. The broadcast receiving device according to claim 2, further comprising
    an average value calculation unit configured to calculate a first average value that is an average value of the first amplitude value in a first specific time period and a second average value that is an average value of the second amplitude value in a second specific time period, the first and second specific time periods being predetermined multiples of the first and second predetermined time periods, respectively,
    the switching determination unit being further configured to determine whether or not the second audio is to be outputted instead of the first audio based on the first average value and the second average value.

4. The broadcast receiving device according to claim 3, wherein the switching determination unit is further configured to determine whether or not a difference obtained by subtracting the first average value from the second average value is greater than or equal to a predetermined first threshold value, and determine that the second audio is to be outputted instead of the first audio when the difference is greater than or equal to the first threshold value.

5. The broadcast receiving device according to claim 4, further comprising
    a genre acquisition unit configured to acquire a first genre information and a second genre information that include genre information about programs received by the first receiving unit and the second receiving unit, respectively; and a time setting unit configured to set the first specific time period and the second specific time period based on the first genre information and the second genre information, respectively, the average value calculation unit being further configured to calculate the first average value as an average value of the first amplitude value in the first specific time period set by the time setting unit, and calculate the second average value as an average value of the second amplitude value in the second specific time period set by the time setting unit.

6. The broadcast receiving device according to claim 5, further comprising a threshold setting unit configured to set the first threshold value based on the first genre information and the second genre information acquired by the genre acquisition unit, the switching determination unit being further configured to determine whether or not the second audio is to be outputted instead of the first audio based on the first threshold value set by the threshold setting unit.

7. The broadcast receiving device according to claim 5, wherein, the switching determination unit is further configured to determine whether or not the first audio is to be outputted instead of the second audio based on the first average value and the second average value when the audio switching processing is executed by the switching execution unit, and the switching execution unit is further configured to execute the audio switching processing on the audio output unit based on a determination result of the switching determination unit so that the first audio is outputted instead of the second audio.

8. The broadcast receiving device according to claim 7, wherein the switching determination unit is further configured to determine whether or not a difference obtained by subtracting the second average value from the first average value is greater than or equal to a predetermined second threshold value, and determine that the first audio is to be outputted instead of the second audio when the difference is greater than or equal to the second threshold value.

9. The broadcast receiving device according to claim 8, wherein the threshold setting unit is further configured to set the second threshold value based on the first genre information and the second genre information acquired by the genre acquisition unit, and the switching determination unit is further configured to determine whether or not the first audio is to be outputted instead of the second audio based on the second threshold value set by the threshold setting unit.

10. The broadcast receiving device according to claim 1, further comprising an average value calculation unit configured to calculate a first average value that is an average value of the first amplitude value in a first specific time period and a second average value that is an average value of the second amplitude value in a second specific time period, the first and second specific time periods being predetermined multiples of the first and second predetermined time periods, respectively, the switching determination unit being further configured to determine whether or not the second audio is to be outputted instead of the first audio based on the first average value and the second average value.

11. The broadcast receiving device according to claim 10, wherein the switching determination unit is further configured to determine whether or not a difference obtained by subtracting the first average value from the second average value is greater than or equal to a predetermined first threshold value, and determine that the second audio is to be outputted instead of the first audio when the difference is greater than or equal to the first threshold value.

12. The broadcast receiving device according to claim 11, further comprising a genre acquisition unit configured to acquire a first genre information and a second genre information that include genre information about programs received by the first receiving unit and the second receiving unit, respectively; and a time setting unit configured to set the first specific time period and the second specific time period based on the first genre information and the second genre information, respectively, the average value calculation unit being further configured to calculate the first average value as an average value of the first amplitude value in the first specific time period set by the time setting unit, and calculate the second average value as an average value of the second amplitude value in the second specific time period set by the time setting unit.

13. The broadcast receiving device according to claim 12, further comprising a threshold setting unit configured to set the first threshold value based on the first genre information and the second genre information acquired by the genre acquisition unit, the switching determination unit being further configured to determine whether or not the second audio is to be outputted instead of the first audio based on the first threshold value set by the threshold setting unit.

14. The broadcast receiving device according to claim 12, wherein, the switching determination unit is further configured to determine whether or not the first audio is to be outputted instead of the second audio based on the first average value and the second average value when the audio switching processing is executed by the switching execution unit, and the switching execution unit is further configured to execute the audio switching processing on the audio output unit based on a determination result of the switching determination unit so that the first audio is outputted instead of the second audio.

15. The broadcast receiving device according to claim 14, wherein the switching determination unit is further configured to determine whether or not a difference obtained by subtracting the second average value from the first average value is greater than or equal to a predetermined second threshold value, and determine that the first audio is to be outputted instead of the second audio when the difference is greater than or equal to the second threshold value.

16. The broadcast receiving device according to claim 15, wherein the threshold setting unit is further configured to set the second threshold value based on the first genre information and the second genre information acquired by the genre acquisition unit, and the switching determination unit is further configured to determine whether or not the first audio is to be outputted instead of the second audio based on the second threshold value set by the threshold setting unit.

17. A broadcast receiving device comprising:

first receiving means for receiving a first television broadcast;

second receiving means for receiving a second television broadcast;

display control means for displaying a first image corresponding to the first television broadcast received by the first receiving means on a main screen in a display means, and displaying a second image corresponding to the second television broadcast received by the second receiving means on a subscreen in the display means;

audio output means for selectively outputting one of a first audio corresponding to the first television broadcast received by the first receiving means and a second audio corresponding to the second television broadcast received by the second receiving means;

switching determination means for comparing the first audio with the second audio, and determining whether or not the second audio is to be outputted instead of the first audio;

switching execution means for executing audio switching processing on the audio output means based on a determination result of the switching determination means so that the second audio is outputted instead of the first audio; and amplitude calculation means for subjecting the first and second audios to spectrum analysis for first and second predetermined time periods, respectively, and for calculating a first amplitude value and a second amplitude value that are total values of amplitudes corresponding to a frequency within a specific range, the switching determination means further performing a function for determining whether or not the second audio is to be outputted instead of the first audio based on the first amplitude value and the second amplitude value.

18. A broadcast receiving method comprising:

receiving a first television broadcast;

receiving a second television broadcast;

displaying a first image corresponding to the first television broadcast on a main screen in a monitor, displaying a second image corresponding to the second television broadcast on a subscreen in the monitor;

selectively outputting one of a first audio corresponding to the first television broadcast and a second audio corresponding to the second television broadcast;

determining whether or not the second audio is to be outputted instead of the first audio based on a comparison between the first audio and the second audio;

executing audio switching processing based on a determination result that the second audio is to be outputted instead of the first audio;

subjecting the first and second audios to spectrum analysis for first and second predetermined time periods, respectively; and calculating a first amplitude value and a second amplitude value that are total values of amplitudes corresponding to a frequency within a specific range, the determining of whether or not the second audio is to be outputted instead of the first audio including determining whether or not the second audio is to be outputted instead of the first audio based on the first amplitude value and the second amplitude value.

* * * * *